United States Patent

Sabó

[11] Patent Number: 5,845,910
[45] Date of Patent: Dec. 8, 1998

[54] INTEGRATED SEALING SYSTEM FOR AUTOMATIC TRANSMISSION

[75] Inventor: Alfredo Miguel Sabó, São Paulo, Brazil

[73] Assignee: Sabo Industria e Comercio, Ltda., Sao Paulo, Brazil

[21] Appl. No.: 760,902

[22] Filed: Dec. 6, 1996

[30] Foreign Application Priority Data

Dec. 13, 1995 [BR] Brazil ..................................... 9505403

[51] Int. Cl.⁶ ................................................. F16J 15/32
[52] U.S. Cl. .......................... 277/553; 277/562; 277/572; 277/573
[58] Field of Search ................................ 277/37, 38, 39, 277/95, 152, 153; 384/486

[56] References Cited

U.S. PATENT DOCUMENTS

| | | | |
|---|---|---|---|
| 2,938,125 | 5/1960 | Peickii et al. ............................ | 277/153 |
| 3,363,911 | 1/1968 | McKinven et al. ...................... | 277/153 |
| 4,588,196 | 5/1986 | Antonini et al. ........................ | 277/153 |
| 5,152,539 | 10/1992 | Takii et al. ............................... | 277/37 |
| 5,582,412 | 12/1996 | Sabo Filho ............................... | 277/153 |
| 5,605,337 | 2/1997 | Puri ......................................... | 277/153 |

*Primary Examiner*—Scott Cummings
*Attorney, Agent, or Firm*—Anderson, Kill & Olick, P.C.

[57] ABSTRACT

An integrated sealing system for automatic transmission made up of a sole part composed essentially of annular structural metal element (10), suitable for assembling in the annular space between the main shaft (1) and semi-shaft of the wheel set (2) and casing (3) of the automatic transmission; and a set of rubber sealing elements to seal all the interstices in that area of the automotive vehicle mechanism, incorporated in the annular structural element (10) formed by radial sealing element (dynamic sealing) (11)–(12); and surface sealing (static sealing); the radial sealing element (11)–(12) consists on the whole of: a first element (11) composed of a rim (20) which seals against the main shaft (1) with a garter type spring (21) to absorb radial efforts; flanges (22) to protect the spring from being released; in addition, the radial sealing element (11)–(12) has a second element (12) consisting of: a rim (25) which seals against the wheel set semi-shaft (2), and a rim (26) that seals against the deflector (27), protects against mud and dust, and is designed to absorb heavy axial motions; the surface sealing element (static sealing) (13) has a thin layer of polymer base glue.

3 Claims, 1 Drawing Sheet

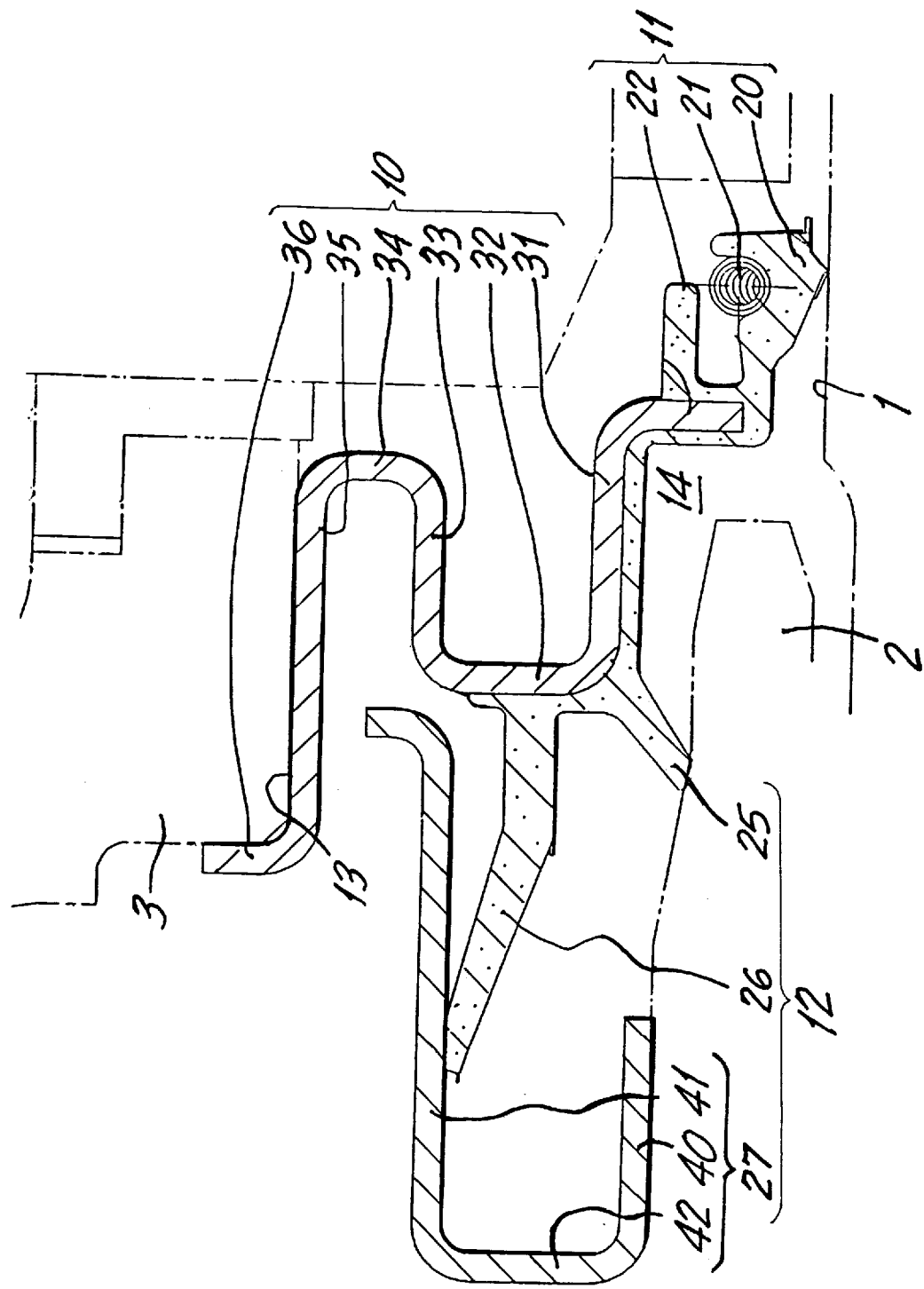

INTEGRATED SEALING SYSTEM FOR AUTOMATIC TRANSMISSION

BACKGROUND OF THE INVENTION

This patent relates an integrated sealing system for automatic transmission related to the auto-parts area, which has been improved to arrive at a simplified construction, to provide a better performance and facilitate its production in relation to similar systems.

The same applicant has submitted another patent request, filed under n° PI 940101-1, for an integrated sealing system for automatic transmission, which was developed in order that one sole part can seal the interstices between the main shaft, semi-shaft of the wheel set and automatic transmission casing.

In spite of the good results attained with the above system, studies on sealing for that important part of automotive vehicles mechanism proceeded and it was concluded that some improvements could be developed.

Such improvements in the integrated sealing system for automatic transmission is an object of this patent, and is at a better construction and performance.

SUMMARY OF THE INVENTION

The object of the invention is achieved by providing an integrated sealing system for automatic transmission made up of a sole part composed essentially of annular structural metal element, suitable for assembling in the annular space between the main shaft and semi-shaft of the wheel set and casing of the automatic transmission, and a set of rubber sealing elements to seal all the interstices in that area of the automotive vehicle mechanism, incorporated in the annular structural element formed by radial sealing element (dynamic sealing), and surface sealing (static sealing). The radial sealing element consists of the whole of a first element composed of a rim which seals against the main shaft with a garter type spring to absorb radial movement and flanges to protect the spring from being released. In addition, the radial sealing element has a second element consisting of a rim which seals against the wheel set semi-shaft, and a rim that seals against the deflector, protects against mud and dust, and is designed to absorb heavy axial motions. The surface sealing element (static sealing) has a thin layer of polymer base glue.

BRIEF DESCRIPTION OF THE DRAWINGS

The feature and advantages of the present invention will become more apparent from the following detailed description read with reference to the accompanying drawings, wherein:

Single FIGURE shows a cross-sectional view of the integrated sealing system according to the present invention.

DETAILED DESCRIPTION OF THE PREFERRED EMBODIMENT

According to the above mentioned illustration, the integrated sealing system, object of this patent, is applied to automatic transmissions of automotive vehicles in the annular interstice between the main shaft 1, derived from the differential gear, and the semi-shaft of the wheel set 2 and casing 3 of the automatic transmission mechanism, and consists essentially of a sole part composed of an annular structural metal element 10, suitable for assembling in the annular space between the main shafts 1 and semi-shaft of the wheel set 2 and the casing 3 of the automatic transmission, and a set of rubber sealing elements to seal all the interstices in that area of the automotive vehicle mechanism, incorporated in the annular structural element 10, which includes radial sealing element (dynamic sealing) 11–12, located in the internal perimeter of the structural element 10, which seals against the main shaft 1 and semi-shaft of the wheel set 2, and element 12 of superficial sealing (static sealing) contained in the external perimeter of the structural element 10 which seals against the casing 3 of the automatic transmission. Such sealing elements 11–12 have been originally incorporated in the structural element 10 by means of vulcanization, the sealing element 13 is applied around the structural element 10 and a portion of grease 14 is contained between the radial element 11–12 and the main shaft 1 and semi-shaft of the wheel set 2.

In the above improvement the radial sealing element 11–12 consists of a first element 11 made up by a rim 20 which seals against the main shaft 1 and works with garter type spring 21 for absorption of radial movement, and flange 22 to keep the spring from being released. In addition, the radial sealing element 11–12 has a second element 12 consisting of a rim 25 that seals against the wheel set semi-shaft 2, and a rim 26 that seals against a deflector 27 and protects against mud and dust, as well as absorbs heavy axial motions.

The superficial sealing element (static sealing) 13 consists of a layer of polymer base glue to seal eventual irregularities on the contact surfaces and it is applied around the external surface of the structural element 10.

On of the advantages of the above system construction over the former one is that it lasts longer. Another advantage of this system is to provide better protection against dust and mud, as well as more capacity to absorb axial motions in relation to the former one.

In addition, this system is easier to be produced as compared to the former one.

In a preferred construction method, as illustrated, the structural element 10 is a annular part with section in meanders and consists substantially of four radial axially displaced branches and three axial branches interconnected with them, that is first extreme internal radial branch 30, first internal axial branch 31, first intermediate radial branch 32, intermediate axial branch 33, second intermediate radial branch 34, second external axial branch 35 and second external extreme radial branch 36.

The first internal extreme radial branch 30, first internal axial branch 31 and first intermediate radial branch 32 have a rubber layer incorporated, from which the following parts are formed: flanges 22 of protection against spring release, sealing rim 20 against the main shaft, sealing rim 25 against the wheel set semi-shaft 2, and sealing rim 26 against the deflector to protect against mud-dust. On the external surface of the second external axial branch 35 of the structural element 10, a surface sealing layer 13 which seals against the casing 3, is provided.

The deflector 27 is a annular part with a C-shaped cross-section and is located around the wheel set semi-shaft 2, with its concavity facing the main shaft 1, and consists of two axial branches, an internal branch shorter one 40, which is located adjacent to the wheel set semi-shaft 2 and an external longer branch 41 against the internal face, which seals rim 26 for protection against mud/dust and ends in a radial tip turned externally; and a radial branch 42 that connects the axials.

Considering the basic construction described above, it is required that the system may be changed as afar as materials, dimensions and constructive details are concerned, but keeping it within the scope of the patent protection.

Optionally, instead of flanges 22 to prevent the spring from being released, as described above, a device for the same purpose can be considered, consisting substantially of an internal safety ring, made of wire, incorporated in the spring (not illustrated), which absorbs the traction when the retainer/spring set works above normal capacity.

What is claimed is:

1. An integrated sealing system for an automatic transmission having a main shaft, a semi-shaft of a wheel set, and a casing, the integrated sealing system comprising:

an annular structural element to be located between the main and semi-shafts, on one hand, and the casing, on the other hand; and sealing means for sealing all of interstices of an area in which the annular structural element is located, wherein the sealing means comprises:

dynamic radial rubber sealing means located between the annular structural element and the main shaft and the semi-shaft and comprising a first element including a first sealing rim engaging the main shaft, and a second sealing rim engaging the semi-shaft;

static sealing means located between an external perimeter of the annular structural element and the casing and comprising a layer of a polymer-based glue applied to the external perimeter of the annular structural element;

a garter spring for biasing the first rim of the first element of the dynamic radial rubber sealing means into engagement with the main shaft and for absorbing radial movement of the main shaft, the first element having flange means against which the garter spring is supported;

a deflector member, the first element including a third rim engaging the deflector for preventing mud and dust reaching the shafts and for absorbing axial forces; and grease means provided between the dynamic radial rubber sealing means and the main shaft.

2. An integrated sealing system according to claim 1, wherein the annular structural element comprises a first innermost radial branch, a first inner axial branch, first intermediate radial branch, first intermediate axial branch, a second intermediate radial branch, a second outer axial branch, and second outermost radial branch;

wherein the dynamic radial rubber sealing means comprises rubber layers associated with the first innermost radial branch, the first inner axial branch, and the first intermediate radial branch, the rubber layers defining the flange means and the sealing rims of the first element;

wherein the glue layer is applied to an external perimeter of the second outer axial branch defining the outer perimeter of the annular structural element; and wherein the deflector member has a C-shaped cross-section, surrounds the semi-shaft and opens toward the main shaft, the deflector member having an inner comparatively shorter axial branch located adjacent to the semi-shaft, an outer comparatively longer axial branch engageable by the third sealing rim of the first element, and a radial branch connecting the comparatively shorter and longer axial branches.

3. An integrated sealing system according to claim 4, wherein the rubber sealing means is connected with the annular structural element by vulcanization.

* * * * *